US009444777B2

United States Patent
Lu (10) Patent No.: US 9,444,777 B2
(45) Date of Patent: Sep. 13, 2016

(54) METHOD AND PROCESSING SYSTEM FOR ROUTING A MESSAGE REQUEST

(75) Inventor: Yan Lu, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 262 days.

(21) Appl. No.: 13/641,464

(22) PCT Filed: Mar. 1, 2011

(86) PCT No.: PCT/CN2011/071431
§ 371 (c)(1),
(2), (4) Date: Oct. 16, 2012

(87) PCT Pub. No.: WO2011/127772
PCT Pub. Date: Oct. 20, 2011

(65) Prior Publication Data
US 2013/0036183 A1    Feb. 7, 2013

(30) Foreign Application Priority Data

Apr. 16, 2010  (CN) .......................... 2010 1 0153289

(51) Int. Cl.
*G06F 15/16*  (2006.01)
*H04L 12/58*  (2006.01)

(52) U.S. Cl.
CPC .............. *H04L 51/28* (2013.01); *H04L 51/04* (2013.01); *H04L 51/30* (2013.01); *H04L 51/36* (2013.01); *H04L 51/14* (2013.01)

(58) Field of Classification Search
CPC . G06F 15/16; G06F 17/30864; H04L 67/42; H04L 51/00; H04L 51/04; H04L 51/36
USPC ......................................................... 709/206
See application file for complete search history.

(56) References Cited

U.S. PATENT DOCUMENTS

| 6,035,404 A | * | 3/2000 | Zhao ............................ 709/225 |
| 2008/0147804 A1 | * | 6/2008 | Gyure et al. .................. 709/206 |
| 2010/0153505 A1 | * | 6/2010 | Oh et al. ....................... 709/206 |
| 2011/0145334 A9 | * | 6/2011 | Colson et al. ................ 709/206 |

FOREIGN PATENT DOCUMENTS

| CN | 101355797 A | 1/2009 |
| CN | 101557352 A | 10/2009 |
| CN | 101668251 A | 3/2010 |

OTHER PUBLICATIONS

P.R. China, State Intellectual Property Office, International Search Report for International Application No. PCT/CN2011/071431, mailed Jun. 9, 2011.

* cited by examiner

*Primary Examiner* — Liangche A Wang
*Assistant Examiner* — Ayele Woldemariam
(74) *Attorney, Agent, or Firm* — Bright IP Law Offices (57) ABSTRACT

A method and a processing system for routing a message request are provided in the present invention. Using the present invention, a message, which is returned by a party receiving the message request, is routed, according to a predefined designation, to a designated client, which is one of multiple simultaneous online clients sharing the identical user identifier, via a server, and therefore the requirements of the users are satisfied and the experiences of the users are improved.

11 Claims, 2 Drawing Sheets

METHOD AND PROCESSING SYSTEM FOR ROUTING A MESSAGE REQUEST

CROSS REFERENCE TO RELATED APPLICATIONS

This application is the U.S. National Stage of International Patent Application No. PCT/CN2011/071431 filed on Mar. 1, 2011, which claims priority to Chinese Patent Application No. 201010153289.2 filed on Apr. 16, 2010. Both the PCT Application and Chinese Application are hereby incorporated by reference in their entirety.

FIELD OF THE INVENTION

The present invention relates to the communication field, and in particular to a method, and a processing system for routing a message request.

BACKGROUND OF THE INVENTION

The traditional Short Message Service (SMS) can provide SMS receipt return function, namely, after a sender sends a short, message, he/she will receive a disposition notification so as to allow him/her to learn that the short message has been sent to the recipient. The multimedia message service receipt return also provides a read report besides the delivery report, namely a read report will be generated after the recipient has read a multimedia message so as to notify the sender that the multimedia message has been read.

Instant message service can support similar disposition notifications. An instant message system differentiates different users by allocating different user identifiers (or, referred to as accounts or addresses) to them, and users use these identifiers for login, registration and communication. To improve user experience, more and more terminals (including cell phone and PC, etc.) support the function that a user identifier is used for logging in multiple terminals. Take instant message service for example, a user can have a user identifier, and with it, log in and register on multiple different terminals.

When an instant message user sends an instant message to a group (including preset group and temporary group), it is very disturbing to the sender if every recipient in the group returns a disposition notification.

For IP telephony or video conference (a group is invited to a conference), the conference invitee is also required to return a receipt message (not necessarily in the form of disposition notification) to the conference initiator, namely the receipt message shall be returned in the path from the invitee to the group server and then to the conference initiator.

Converged IP Messaging (CPM) can realize mutual communication of multiple message services, providing a consistent, convenient and unified message service experience. The service forms of CPM include: pager-mode based CPM, session-mode based large message mode CPM and other session based CPM Session services. Before using these services normally, a user has to register and log in the CPM system, namely "on line" (as is often said) or available to the CPM system.

CPM address is the user identifier in the CPM system (also referred to as CPM enabler, namely CPM service engine) used for differentiating different users in the system and can support two kinds of disposition notifications, namely delivery report and read report. To improve user experience, in the CPM system, a user can have multiple CPM addresses and register in multiple terminal equipment, namely "be online" simultaneously.

In the related prior art, the solution as follows: if a user sending an instant message to a group states definitely that disposition notification is required, the CPM system can combine the disposition notifications returned by each recipient and then send it to the instant message sender, which can free users from being disturbing. Combination method includes, for example, each recipient in the group returns a disposition notification which is routed to a group server who combines the multiple disposition notifications and sends the disposition notification combined to the sender cheat of the original instant message.

In the instant message system and CPM system above, if a user sends a message to a group and applies for disposition notification for the message, the service server at the network will send the disposition notification sent by the recipient to the sender of the original message. To avoid disturbing users, disposition notification shall be routed to the related group server for combination. However, if multiple message clients of the original sender are simultaneously online, it is difficult to determine to which message client the disposition notification shall be sent and carry out follow-up processing tor the disposition notification in the prior art, which will cause the disposition notification cannot be sent to the designated client.

Similarly, for the CPM Session service in the CPM system, when a CPM client of an initiator of the CPM Session initiates a CPM Session dialogue to a group, the problem above may also exist if the recipient is required to return a receipt message to a CPM client of the original initiator. Specifically, a user initiates a CPM Session dialogue to a group, each recipient in the group returns a receipt message to the original sender client, then the receipt message can be routed to the CPM controlling function entity by each dialogue invitee as the CPM Message disposition notification introduced above, and then the CPM controlling function entity combines the receipt messages and sends it to the original session inviter client.

SUMMARY OF THE INVENTION

The present invention provides a method and a processing system for routing a message request to solve the problem above.

The present invention provides a method for routing a message request firstly, wherein the method includes:

when one of multiple clients sharing an identical user identifier sends a first message request, carrying in the first message request a globally unique identifier (GUID) of a designated client and a routing address of a designated server and routing the first message request to the designated server according to the routing address of the designated server, wherein the designated client is one of the multiple clients sharing the identical user identifier;

the designated server generating a second message request according to the first message request, wherein the second message request carries the routing address of the designated server and the QUID of the designated client and is received by a recipient client;

the recipient client generating a third message request, wherein the third message request carrying the routing address of the designated server and the GUID of the designated client acquired from the second message request and routing the first message request to the designated server according to the routing address of the designated server;

the designated server generating a fourth message request according to the third message request wherein the fourth message request carries the GUID of the designated client acquired from the third message request and is routed to the designated client corresponding to the GUID according to the GUID.

Furthermore, the multiple clients sharing the identical user identifier are instant messaging clients, and the server is an instant-messaging group logical processing function entity;

the first message request is a first instant message sent by one of the instant messaging clients;

the second message request is a second instant message sent by the instant-messaging group logical processing function entity;

the third message request is a disposition notification, corresponding to the second instant message, sent by the recipient client of the instant message;

the fourth message request is a disposition notification sent by the instant-messaging group logical processing function entity; and the designated client is a predefined one of the instant messaging clients sharing the identical user identifier, and is configured to receive the disposition notification sent by the instant-messaging group logical processing function entity and also referred to as a designated recipient client of the disposition notification.

Furthermore, for an instant message sent to a group, the step of routing the disposition notification of the instant message to the designated recipient client of the disposition notification includes:

each recipient client of the instant message in the group acquiring the routing address of the instant-messaging group logical processing function entity and the GUID of the designated recipient client of the disposition notification from the received second instant message and carrying, in the disposition notification, the routing address of the instant-messaging group logical processing function entity and the GUID of the designated recipient client of the disposition notification; the disposition notification being routed to the instant-messaging group logical processing function entity according to the routing address of the instant-messaging group logical processing function entity; and the instant-messaging group logical processing function entity acquiring the GUID of the designated recipient client of the disposition notification contained in the disposition notification, and then carrying the GUID contained in a combined disposition notification, wherein the combined disposition notification is routed to the designated recipient client of the disposition notification according to the GUID.

Furthermore, the GUID includes: a Globally Rentable User Agent Uniform Resource Identifier (GRUU).

Furthermore, when an instant messaging client sends an instant message, the step of carrying in the instant message the GUID of the designated recipient, client of the disposition notification includes, specifically;

if the instant message is sent using SIP:MESSAGE, carrying the GRUU in the header of a SIP:MESSAGE message or in the MIME header in the message;

if the signaling control is carried out using the SIP protocol and the instant message is sent using MSRP, carrying the GRUU in the header of a SIP:INVITE message or in the content of a media-plane message.

Furthermore, the method of carrying the GRUU in the header of a SIP:MESSAGE message includes: using a From field of the message header for carrying the GRUU;

the method of carrying the GRUU in the MIME header in the message includes: if the instant message is in the format of Common Presence and Instant Messaging (CPIM), using a From field, of the CPIM header for carrying the GRUU;

the method of carrying the GRUU in the header of a SIP:INVITE message includes: using a SIP: From field or a SIP: Contact field for carrying the GRUU; and the method of carrying the GRUU in the content of the media-plane message comprises; if the instant message content is in the format of CPIM, using the From field of the CPIM header for carrying the GRUU.

Furthermore, the recipient client of the instant message carries in the disposition notification the routing address of the instant-messaging group logical processing function entity according to one of the following methods: carrying the routing address of the instant-messaging group logical processing function entity in a Request-Uniform Resource identifier (Request-URI) field in the disposition notification; or carrying the routing address of the instant-messaging group logical processing function entity in a IMDN-Route header field of the message content of the disposition notification.

Furthermore, the recipient client of the instant message carries in the disposition notification the GUID of the recipient client of the disposition notification according to one of the following methods: earning the GUTD in the Request-URI field in the disposition notification; or carrying the GUTD in a IMDN-Route header field of the message content of the disposition notification: or carrying the GUID in a CPIM To header field of the message content of the disposition notification; or carrying the GUID in a CPIM From header field of the message content of the disposition notification.

Furthermore, the instant-messaging group logical processing function entity carries in the disposition notification the GUID of the designated recipient client of the disposition notification according to the following method: carrying the GUID of the designated recipient client of the disposition notification in a Request-URI in the disposition notification.

Furthermore, the client sending the instant message and the designated recipient client of the disposition notification are CPM clients; the instant message is a CPM message in a CPM system, namely a CPM pager mode message or a large message mode CPM message: the instant-messaging group logical processing function entity is a controlling function entity of the CPM system.

The present invention also provides a system for processing a message request, including a sender client of message requests, a recipient client of message requests and a designated server, wherein, the sender client of message requests is configured to send the first message request and to use the first message request to carry the GUID of the designated client and the routing address of the designated server; wherein the designated client is the sender client of the message request or one of the clients with the user identifier identical to that for the sender client of the message request;

the designated server is configured to receive the first message request, generate a second message request and to use the second message request to carry the routing address of the designated server and the GUID of the designated client;

the recipient client of message requests is configured to receive the second message request, to generate a third message request and to use the third message request to carry the routing address of the designated server and the GUID of the designated client acquired from the second message request;

the designated server is further configured to receive the third message request, generate a fourth message request and to use the fourth message request to carry the GUID acquired from the third message request.

Furthermore, the sender client and the recipient client of message requests are instant messaging clients; the server is an instant-messaging group logical processing function entity of an instant messaging system;

the first message request is an instant message sent by a sender instant messaging client;

the second message request is an instant message sent by the instant-messaging group logical processing function entity;

the third message request is a disposition notification, corresponding to the second instant message, sent by the recipient client of the instant message;

the fourth message request is a disposition notification sent by the instant-messaging group logical processing function entity;

the designated client is another predefined client having the same user identifier as the sender instant messaging client, namely the designated recipient client of the disposition notification.

Furthermore, the sender client and the designated recipient client of the disposition notification are the CPM clients; the instant message is the CPM message in the CPM system; the instant-messaging group logical processing function entity is a controlling function entity of the CPM system.

With the present invention, the existing routing service of a message request is improved and supplemented. Comparatively speaking, in the prior art, when multiple clients of a message request sender sharing the identical user identifier are simultaneously online, the message fed back by a recipient of the message request cannot be routed to the designated client via a server; while with the present invention, a message, which is fed hack by a party receiving the message request, is routed, according to a predefined designation, to a designated client, which is one of multiple simultaneous online clients sharing the identical user identifier, via a server, and therefore the requirements of the users are satisfied and the experiences of the users are improved.

BRIEF DESCRIPTION OF THE DRAWINGS

The accompanying drawings disclosed herein, constituting a part of the application, are provided for further understanding the present invention. The exemplary embodiments of the present invention and the description thereof are used to illustrate rather than limit the present invention, wherein.

DETAILED DESCRIPTION OF THE EMBODIMENTS

The present invention will be further illustrated in conjunction with the drawings by taking instant message as an example, it shall be noted that the embodiments in the application and the characteristics in the embodiments can be mutually combined if no conflict occurs.

According to an embodiment of the present invention, the GUID of a client is used to differentiate different clients sharing an identical user identifier.

The embodiment of the present invention provides a specific solution to the problem that: after a sender of instant message sends an instant message to a group, the disposition notification of the instant message cannot be routed to a designated client when the sender has multiple clients simultaneously online (namely multiple clients sharing an identical user identifier are simultaneously online), wherein the solution specifically includes: when the sender client sends an instant message, the instant message carries a routing address of a group server (namely a group's logical processing function entity) and a GUID of the recipient client of a disposition notification; after the instant message is routed to the group server, the group server sends an instant message which carries the routing address of the group server and the GUID of the recipient of the disposition notification to each recipient in the group; when the recipient client replies with a disposition notification, the disposition notification carries the routing address of the group server and the GUID of the recipient client of the disposition notification.

Figure 1:
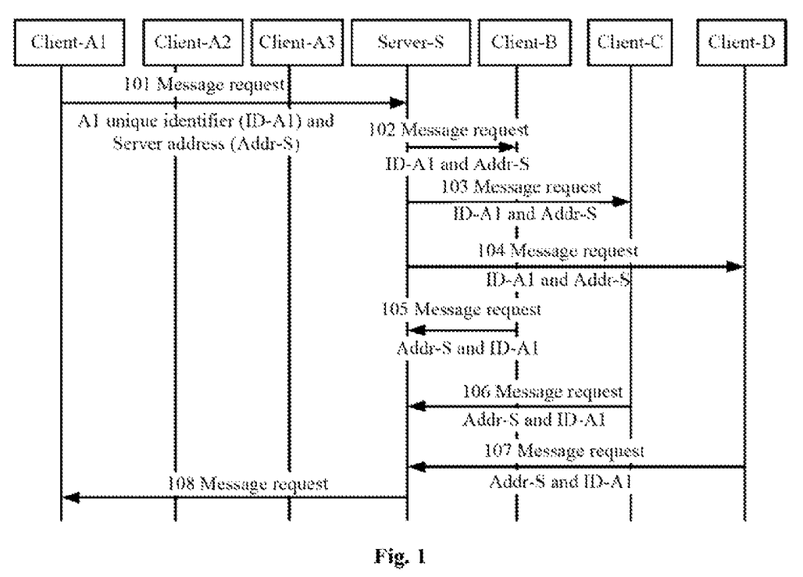
FIG. 1 is a flow chart of sending an instant message and a disposition notification according to an embodiment of the present invention.

FIG. 1 is a flow chart of sending an instant message and a disposition notification according to an embodiment of the present invention. In FIG. 1, the sender has n sender clients sharing an identical user identifier (also referred to as instant message clients) which are online simultaneously (specifically, at the time when an instant message server sends a disposition notification to the sender clients); after one of the sender clients sends an instant message, the instant message is routed to a group server since the routing address of the message is instant-messaging group server; the group server sends an instant message to each recipient in the group: to ensure the disposition notification can be sent back to the group server for combination, the group server carries the routing address of the server in the instant message; after receiving the instant message, the recipient client replies to the instant message with a disposition notification that carries the address of the group server and the GUID of the recipient client of the disposition notification.

In practical applications, according to the solution, after receiving an instant message, the recipient client acquires the routing address of an instant-messaging group server and the GUID of the recipient client of the disposition notification carried in the instant message, sends a disposition notification that carries the routing address of the group server and the GUID of the recipient client.

The recipient client can use the disposition notification to carry the address of the group server according to one of the following methods: the recipient client can use the Request-URI field in the disposition notification, or the header field (IMDN-Route) of the message content of the disposition notification to carry the address of the group server above (wherein IMDN-Route is field name, IMDN is instant message processing report, namely delivery report and read report, and IMDN_Route refers to the routing field of processing reports); or, the recipient client can use the disposition notification to carry the GUID of the recipient client of the disposition notification above according to one of the following methods: the recipient client uses the Request-URI field in the disposition notification, or the content header field (From field) of the disposition notification, or the content header field (CPM To) of the disposition notification, or the content header field (IMDN-Route) of the disposition notification to carry the GUID.

According to the solution, the QUID of the sender client can be the GRUU of the sender client.

During the specific implementation, the two solutions above can be used in the CPM system and the instant message system based on IMS. In the CPM system, the client of the sender above can be CPM client; the instant message can be CPM message in the CPM system, preferably, CPM pager mode message or large message mode CPM message in the CPM system; the instant message server can carry participating function entity and controlling function entity of the CPM system.

In the CPM system, with the solutions above, the instant-messaging group server saves the GUID of the designated recipient client of the disposition notification in the instant message system, then the GUID can also be saved by the source end participating function entity where the sender belongs, or by the destination end participating function entity where the sender belongs.

For the instant message referred to by the embodiment of the present invention, as to the general instant message service, the message content of an instant message can be regarded as being encoded in the format of MIME. If the instant message is a CPM message, the two modes of CPM message can be determined, namely the message content of a CPM pager mode message and a large message mode CPM message. The instant message content of the two modes is encoded, in the format of common presence and instant messaging (CPIM).

Furthermore, the solution above according to the embodiment of the present invention is also applicable to an instant message system based on IP Multimedia Subsystem (IMS for short). In the IMS system, a SIP/IP core network is an IMS core network, and the instant message server is an instant message application server in the IMS system.

In addition, the present invention is also applicable to other instant message systems based on SIP protocol. The instant message framework according to the present invention is the framework based on SIP/IP core network. In some network environments, SIP/IP core network can be a function unit integrated with an instant message application server. The present invention is also applicable to such networking.

The two solutions above provided by the embodiments of the present invention will be illustrated hereinafter with the embodiments.

FIG. 1 is a flow chart of the present invention without loss of generality, wherein Client-B, Client-C and Client-D are supposed to be the three instant message recipient clients. The embodiment mainly includes the steps below.

Step 101, a sender client sends an instant message to a group, wherein the instant message is routed to a group server. The message request carries a unique identifier (ID-A1) of A1 and an address of the server S. Wherein, the instant message carries indication information for requesting disposition notification, wherein the disposition notification includes but is not limited to at least one of the following reports: delivery report and read report.

The instant message is transmitted through the SIP Message mode or the large message mode based on MSRP protocol. FIG. 1 omits the specific procedure of sending the instant message. During the specific implementation, it is possible that the instant message may carry no the indication information for requesting receipt messages. If so, it can be determined according to a preset default of requesting or not requesting for receipt messages. The instant message carries the routing address of the group server and the QUID of the designated recipient of the disposition notification which is the sender of the instant message or other clients of the recipient sharing an identical user identifier.

In practical applications, the instant message server can be a service system comprising one or multiple function entities, and the group server is a function entity in the instant message server, mainly for handling services related to group. Generally, the entity at the network (relative to the client) which realizes all instant message service functions can be regarded as an instant message server. FIG. 1, without showing other function entities, only indicates the group servers having a direct connection with the present invention.

Step 102-Step 104, the group server sends an instant message to the users in a group (Client-B, Client-C and Client-D).

The instant message sent by a group server carries the routing address of the server to ensure the disposition notification can return to the group server for combination process.

Step 105-Step 107, Client-B, Client-C and Client-D send their disposition notifications.

The instant message recipient uses the disposition notification to carry the address of the group server and the GUID of the designated recipient of the disposition notification to ensure the disposition notification can return to the group server for combination process.

Step 108, after receiving the disposition notification from each recipient in the group, the group server combines the disposition notifications and sends the combined disposition notification to the designated recipient client of the disposition notification.

In the steps above, the instant message server can save the GUID of the designated recipient of the disposition notification carried by the instant message, so that the group server can acquire the identifier from the instant message server, while the recipient client of the instant message does not necessarily carry the GUID.

In an embodiment of the present invention, the signaling control can be carried out for an instant message through MESSAGE mode of SIP protocol or SIP protocol and the instant message content is sent through MSRP protocol, wherein, when the instant message content is sent through MESSAGE mode of SIP protocol, the content format of the instant message is encoded according to Multipurpose Internet Mail Extensions (MIME) and the indication information of the request receipt returning message is carried in the header of MIME. When the signaling control can be carried out for an instant message through SIP protocol and the instant message content is sent through MSRP protocol, the content format of the instant message is encoded according to MIME protocol and the indication information of the request receipt returning message is carried in the header of MIME of a MSRP SEND message body.

In Step 101 above, the GUID of the sender client can be the GRUU of the client. If the instant message content is sent through SIP:MESSAGE, the GRUU is carried in the header of a SIP:MESSAGE message, for example the From field or Contact field of the message header; or is carried in the header of MIME in the message, for example the From field of the CPIM header. If signaling control is carried out through SIP protocol and an instant message content is sent through MSRP, the GRUU is carried in the header of a SIP:INVITE message, for example, the SIP: From field and the SIP: Contact field; or is carried in the media message content, for example, MIME header, and the From field of the CPIM header when the instant message content is in the form of CPIM.

In Step 101, the routing address related to the group server is carried in the SIP Request-URI in an instant message. For a pre-defined group, the address of the pre-defined group is set to be the routing address; for a temporary group, the address of the pre-defined group is set to be the routing address. According to the address, the instant message is routed to the group server which adds its routing address in the header field (IMDN-Record-Route) of CPIM of the instant message content when sending an instant message to each recipient in the group.

The recipient can use the SIP header field (Request-URI) to carry the routing address of the group server in the disposition notification, and use the header field (CPIM-To) of CPIM of the instant message content to carry the GUID of the recipient client of the disposition notification, carried by the instant message.

After receiving the disposition notification from each recipient, the group server combines the disposition notifications and sends the combined one to the recipient of the disposition notification. Specifically, the server takes out the GUID canted by CPIM-To and sets the SIP Request-URI field as the GUID of the recipient of the disposition notification.

The embodiment is applicable to the CPM system and the group server in the embodiment is the CPM controlling function entity.

In the CPM system, the disposition notification sent by the recipient CPM client of the CPM message is routed to the controlling function entity for combination and then sent to the recipient CPM client of the disposition notification.

The terminal mentioned above refers to a physical entity operating instant message clients. Generally, a physical entity can operate an instant message client, so sending to a specific terminal is sending to the instant message client operated on the terminal.

It shall, be noted that, in the embodiment above, the controlling function entity of the CPM system can acquire and save the GUID of the recipient of a disposition notification carried in the instant message, and add the GUID when returning the disposition notification so that the disposition notification can be sent to the designated recipient client of the disposition notification. However, the design is not limited to this. In the present invention, the CPM participating function entity can also acquire and save the GUID of the recipient of the disposition notification earned in the instant message alter receiving the instant message.

In practical applications, the system above can be applied to the CPM system; the sender client and the designated recipient client of the disposition notification can be CPM client; the instant message server at least includes the participating function entity and controlling function entity of the CPM system; the instant message can be CPM message in the CPM system, specifically pager mode message or large message mode CPM message in the CPM system.

Figure 2:
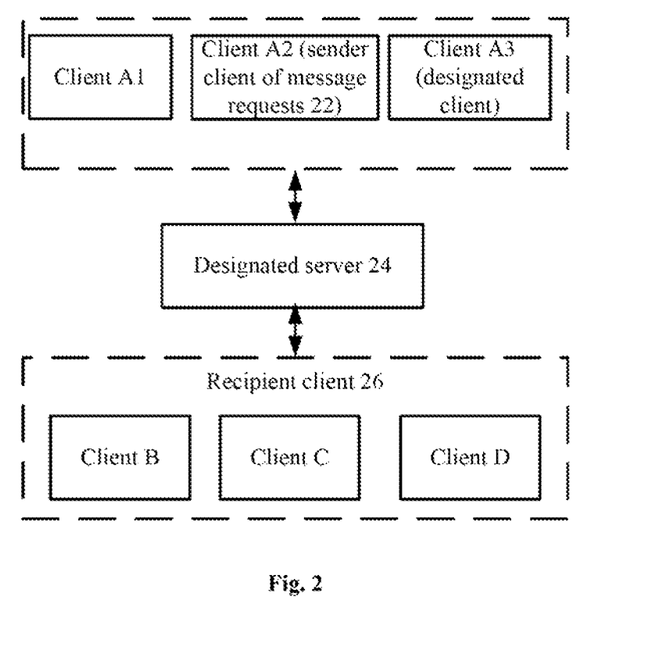
FIG. 2 is a schematic diagram of the structure of the processing system for routing a request message according to an embodiment of the present invention.

According to an embodiment of the present invention, another kind of system for processing disposition notification is provided. FIG. 2 is a schematic diagram of the structure of a system for routing a message request according to an embodiment of the present invention.

The sender client 22 of message requests is configured to send a first message request and use the first message request to carry the GUID of a designated client and a routing address of a designated server 24; wherein the designated client is the sender client of the message request or one of the clients with the user identifier identical to that for the sender client of the message request.

The designated server 24 is configured to receive the first message and to generate a second message request, and also to use the second message request to carry the routing address of the designated server 24 and the GUID of the designated client.

The recipient client 26 of message requests is configured to receive the second message request, to generate a third message request and to use the third message request to carry the routing address of the server 24 and the GUID of the designated client acquired from the second message request.

The designated server 24 is also configured to receive the third message request, generate a fourth message request and to use the fourth message request to carry the GUID acquired from the third message request.

In the above, Client A1, Client A2 and Client A3 are simultaneously online clients sharing an identical user identifier, Client B, Client C and Client D are the recipient clients of the message request sent by a sender client.

According to one system embodiment provided by the present invention, the sender client and the recipient client of the message request are the clients of the instant message; the server is a group's logical processing function entity in the instant message system;

the first message request is an instant message sent by a sender instant message client;

the second message request is an instant message sent by the instant-messaging group logical processing function entity;

the third message request is a disposition notification corresponding to the second instant message sent by the recipient client of the instant message;

the fourth message request is a disposition notification sent by instant-messaging group the logical processing function entity; and the designated client is another predefined client having the same user identifier as the sender instant message client, namely the designated recipient client of the disposition notification.

According to another system embodiment provided by the present invention, the sender client and the designated recipient client of the disposition notification are the CPM clients; the instant message is CPM message in the CPM system; the group's logical processing function entity is the controlling function entity of the CPM system.

To sum up, the sending solution of disposition notification provided by the embodiment of the present invention is especially applicable to the situation where multiple clients are simultaneously online after an instant message sender sends an instant message to a group, therefore the problem that disposition notification cannot be sent to the designated client when multiple clients of the instant message sender are simultaneously online is solved and the experiences of the users are improved.

It shall be noted that in the method put forward by the present invention, the group server can save the GUID of the disposition notification carried by the instant message locally, while the instant message recipient may not add the identifier in the disposition notification. When it is necessary for the group server to return a disposition notification to the instant message sender, the group server adds the unique identifier of the recipient client of the disposition notification saved locally into the disposition notification, and sends it out.

When receiving an instant message, the instant-messaging group server acquires and saves the GUID of the sender client carried by the instant message; the recipient client sends a disposition notification in the existing mode; the instant-messaging group server combines the disposition notification from each recipient and makes the disposition notification processed carry the GUID of the sender client above saved (specifically, it can be carried by Request-URI of the disposition notification); the disposition notification is routed to the sender client corresponding to the GUID.

In practical applications, the instant-messaging group server can record the information related to the instant message, for example, message ID, to determine the disposition notification is for the instant message above according to the message ID of the disposition notification after receiving the disposition notification of the instant message, so as to associate the instant message with its disposition notification. In the prior art, many methods for determining the correspondence between an instant message and a disposition notification have been provided, while the embodiment of the present invention does not put any limitation on what specific methods to be taken.

It is obvious for the person skilled in this art that, the modules or steps of the present invention above can be also realized by a general computer device. They can be integrated in a single computer device or distributed on the network composed of several computer devices, or alternatively achieved by executable codes of a computer device, so as to store them in a storage unit for execution by a computer device, or make them into different integrated circuit modules or make multiple modules or steps of them to a single integrated circuit module for realization of the present invention. In this way, the present invention is not restricted to the combination of any specific hardware and software.

The description above is just the preferred embodiments of the present invention, and is not used to limit the present invention. For the technicians in the field, the present invention can have various alterations and changes. Any such change, equivalent substitution or improvement made within the spirit and principle of the present invention should be covered in the protection scope of the present invention.

What is claimed is:

1. A method for routing a message request, the method comprising:
    when multiple clients are simultaneously online and one of the multiple clients sharing an identical user identifier sends a first message request, carrying in the first message request a globally unique identifier (GUID) of a designated client and a routing address of a designated server and routing the first message request to the designated server according to the routing address of the designated server, wherein the designated client is one of the multiple clients sharing the identical user identifier;
    the designated server generating a second message request according to the first message request, wherein the second message request carries the routing address of the designated server and the GUID of the designated client and the second message request is received by a recipient client;
    the recipient client generating a third message request, wherein the third message request carries the routing address of the designated server and the GUID of the designated client acquired from the second message request and the third message request is routed to the designated server according to the routing address of the designated server; and
    the designated server generating a fourth message request according to the third message request, wherein the fourth message request carries the GUID of the designated client acquired from the third message request and the fourth message request is routed to the designated client corresponding to the GUID according to the GUID;
    wherein the multiple clients sharing the identical user identifier are instant messaging clients, and the server is an instant-messaging group logical processing function entity; and
    the designated client is a predefined one of the instant messaging clients sharing the identical user identifier, and is configured to receive a disposition notification sent by the instant-messaging group logical processing function entity and also referred to as a designated recipient client of the disposition notification;
    wherein the first message request is a first instant message sent by one of the instant messaging clients;
    the second message request is a second instant message sent by the instant-messaging group logical processing function entity;
    the third message request is a disposition notification, corresponding to the second instant message, sent by a recipient client of the instant message;
    the fourth message request is a disposition notification sent by the instant-messaging group logical processing function entity;
    wherein the GUID comprises: a Globally Routable User Agent Uniform Resource Identifier (GRUU);
    wherein when an instant messaging client sends an instant message, the step of carrying in the instant message the GUID of the designated recipient client of the disposition notification, comprises: if the instant message is sent using SIP:MESSAGE, carrying the GRUU in the header of a SIP:MESSAGE message or in the Multipurpose Internet Mail Extensions (MIME) header in the message; if the signaling control is carried out using the SIP protocol and the instant message is sent using MSRP, carrying the GRUU in the header of a SIP: INVITE message or in the content of a media-plane message;
    wherein the method of carrying the GRUU in the header of a SIP:MESSAGE message comprises: using a From field of the message header for carrying the GRUU;
    the method of carrying the GRUU in the MIME header in the message comprises: if the instant message is in the format of Common Presence and Instant Messaging (CPIM), using a From field of the CPIM header for carrying the GRUU;
    the method of carrying the GRUU in the header of a SIP:INVITE message comprises: using a SIP: From field or a SIP: Contact field for carrying the GRUU; and
    the method of carrying the GRUU in the content of the media-plane message comprises: if the instant message content is in the format of CPIM, using the From field of the CPIM header for carrying the GRUU.

2. The method as claimed in claim 1, wherein, for an instant message sent to a group, the step of routing the disposition notification of the instant message to the designated recipient client of the disposition notification comprises:
    each recipient client of the instant message in the group acquiring the routing address of the instant-messaging group logical processing function entity and the GUID of the designated recipient client of the disposition notification from the received second instant message and carrying, in the disposition notification, the routing address of the instant-messaging group logical processing function entity and the GUID of the designated recipient client of the disposition notification; the disposition notification being routed to the instant-messaging group logical processing function entity according to the routing address of the instant-messaging group logical processing function entity; and the instant-messaging group logical processing function entity acquiring the GUID of the designated recipient client of the disposition notification contained in the disposition notification, and then carrying the GUID in a combined disposition notification, the combined disposition notification being routed to the designated recipient client of the disposition notification according to the GUID.

3. The method as claimed in claim 2, wherein the recipient client of the instant message carries in the disposition notification the routing address of the instant-messaging group logical processing function entity according to one of the following methods: carrying the routing address of the instant-messaging group logical processing function entity in a Request Uniform Resource Identifier (Request-URI) field in the disposition notification; or carrying the routing address of the instant-messaging group logical processing function entity in a IMDN-Route header field of the message content of the disposition notification.

4. The method as claimed in claim 2, wherein the recipient client of the instant message carries in the disposition notification the GUID of the recipient client of the disposition notification according to one of the following methods: carrying the GUID in the Request-URI field in the disposition notification; or carrying the GUID in a IMDN-Route header field of the message content of the disposition notification; or carrying the GUID in a CPIM To header field of the message content of the disposition notification; or carrying the GUID in a CPIM From header field of the message content of the disposition notification.

5. The method as claimed in claim 2, wherein the instant-messaging group logical processing function entity carries in the disposition notification the GUID of the designated recipient client of the disposition notification according to the following method: carrying the GUID of the designated recipient client of the disposition notification in a Request-URI in the disposition notification.

6. The method as claimed in claim 1, wherein the client sending the instant message and the designated recipient client of the disposition notification are CPM clients; the instant message is a CPM message in a CPM system, namely a CPM pager mode message or a large message mode CPM message; the instant-messaging group logical processing function entity is a controlling function entity of the CPM system.

7. A system for processing a message request, comprising:
a sender client of message requests having a first hardware processor, a recipient client of message requests having a second hardware processor and a designated server having a third hardware processor, wherein, the sender client of message requests is one of multiple clients sharing an identical user identifier, and the multiple clients are simultaneously online;
the sender client of message requests is configured to send a first message request and to use the first message request to carry the GUID of the designated client and the routing address of the designated server;
the designated server is configured to receive the first message request, generate a second message request and to use the second message request to carry the routing address of the designated server and the GUID of the designated client;
the recipient client of message requests is configured to receive the second message request, to generate a third message request and to use the third message request to carry the routing address of the designated server and the GUID of the designated client acquired from the second message request; and
the designated server is further configured to receive the third message request, to generate a fourth message request and to use the fourth message request to carry the GUID acquired from the third message request;
wherein the sender client and the recipient client of message requests are instant messaging clients; the server is an instant-messaging group logical processing function entity of an instant messaging system; and
the designated client is a predefined one of the instant messaging clients sharing the identical user identifier, and is configured to receive a disposition notification sent by the instant-messaging group logical processing function entity and also referred to as a designated recipient client of the disposition notification;
wherein the first message request is an instant message sent by a sender instant messaging client;
the second message request is an instant message sent by the instant-messaging group logical processing function entity;
the third message request is a disposition notification, corresponding to the second instant message, sent by the recipient client of the instant message;
the fourth message request is a disposition notification sent by the instant-messaging group logical processing function entity; and
the user identifier is used for differentiating addresses or accounts of different users in a system according to the method of the present invention;
wherein the GUID comprises: a Globally Routable User Agent Uniform Resource Identifier (GRUU);
wherein when an instant messaging client sends an instant message, the step of carrying in the instant message the GUID of the designated recipient client of the disposition notification, comprises: if the instant message is sent using SIP:MESSAGE, carrying the GRUU in the header of a SIP:MESSAGE message or in the Multipurpose Internet Mail Extensions (MIME) header in the message; if the signaling control is carried out using the SIP protocol and the instant message is sent using MSRP, carrying the GRUU in the header of a SIP: INVITE message or in the content of a media-plane message;
wherein the method of carrying the GRUU in the header of a SIP:MESSAGE message comprises: using a From field of the message header for carrying the GRUU;
the method of carrying the GRUU in the MIME header in the message comprises: if the instant message is in the format of Common Presence and Instant Messaging (CPIM), using a From field of the CPIM header for carrying the GRUU;
the method of carrying the GRUU in the header of a SIP:INVITE message comprises: using a SIP: From field or a SIP: Contact field for carrying the GRUU; and the method of carrying the GRUU in the content of the media-plane message comprises: if the instant message content is in the format of CPIM, using the From field of the CPIM header for carrying the GRUU.

8. The system as claimed in claim 7, wherein the sender client and the designated recipient client of the disposition notification are CPM clients; the instant message is a CPM message in a CPM system; the instant-messaging group logical processing function entity is a controlling function entity of the CPM system.

9. The method as claimed in claim 2, wherein, the GUID comprises: a Globally Routable User Agent Uniform Resource Identifier (GRUU).

10. The method as claimed in claim 9, wherein when an instant messaging client sends an instant message, the step of carrying in the instant message the GUID of the designated recipient client of the disposition notification, comprises:
  if the instant message is sent using SIP:MESSAGE, carrying the GRUU in the header of a SIP:MESSAGE message or in the MIME header in the message;
  if the signaling control is carried out using the SIP protocol and the instant message is sent using MSRP, carrying the GRUU in the header of a SIP:INVITE message or in the content of a media-plane message.

11. The method as claimed in claim 10, wherein,
the method of carrying the GRUU in the header of a SIP:MESSAGE message comprises: using a From field of the message header for carrying the GRUU;
the method of carrying the GRUU in the MIME header in the message comprises: if the instant message is in the format of Common Presence and Instant Messaging (CPIM), using a From field of the CPIM header for carrying the GRUU;
the method of carrying the GRUU in the header of a SIP:INVITE message comprises: using a SIP: From field or a SIP: Contact field for carrying the GRUU; and
the method of carrying the GRUU in the content of the media-plane message comprises: if the instant message content is in the format of CPIM, using the From field of the CPIM header for carrying the GRUU.

\* \* \* \* \*